(12) United States Patent
Carlsson et al.

(10) Patent No.: US 7,758,679 B2
(45) Date of Patent: Jul. 20, 2010

(54) TREATING UNIT FOR TREATING A LOADED SOLVENT STREAM HAVING A TIME VARYING CONCENTRATION OF CONTAMINANT

(75) Inventors: Anders Carlsson, Amsterdam (NL); Gijsbert Jan Van Heeringen, Amsterdam (NL); Thijme Last, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/540,790

(22) Filed: Aug. 13, 2009

(65) Prior Publication Data

US 2009/0293731 A1       Dec. 3, 2009

Related U.S. Application Data

(62) Division of application No. 10/592,851, filed on Sep. 14, 2006, now Pat. No. 7,597,742.

(51) Int. Cl.
*B01D 47/00*       (2006.01)
(52) U.S. Cl. .............................. 96/234; 96/235; 96/255; 96/265; 96/8; 96/11; 96/13; 96/159; 96/169; 96/191; 96/207; 423/220; 423/228; 423/229
(58) Field of Classification Search .................. 95/8, 95/11, 13, 186, 235, 159, 169, 191, 207; 423/220, 228, 229; 96/234, 235
See application file for complete search history.

(56) References Cited

U.S. PATENT DOCUMENTS

| | | | | |
|---|---|---|---|---|
| 2,375,559 | A * | 5/1945 | Hutchinson et al. | 423/210 |
| 3,733,788 | A | 5/1973 | Crowley | 55/228 |
| 3,751,885 | A | 8/1973 | McNeely | 55/267 |
| 4,147,756 | A | 4/1979 | Dahlstrom et al. | 423/242 |
| 4,578,253 | A | 3/1986 | Gill et al. | 423/87 |
| 4,840,648 | A | 6/1989 | Grunewald et al. | 55/44 |
| 4,875,998 | A * | 10/1989 | Rendall | 208/390 |
| 4,976,935 | A * | 12/1990 | Lynn | 423/222 |

(Continued)

FOREIGN PATENT DOCUMENTS

JP           61255992           11/1986

OTHER PUBLICATIONS

European Search Report (EP04251543).

*Primary Examiner*—Robert J Hill, Jr.
*Assistant Examiner*—Christopher P Jones
(74) *Attorney, Agent, or Firm*—Charles W. Stewart

(57) ABSTRACT

A treating unit that comprises an absorber unit for contacting a regenerated solvent with a gas stream loaded with contaminants to yield a treated gas stream and a loaded solvent stream; a regenerator unit for stripping the loaded solvent stream to yield a loaded gas stream and the regenerated solvent; and a device for smoothing contaminant peak concentrations in the loaded solvent stream and for receiving the loaded solvent stream. The device comprises a first hold-up tank having a first inlet and a first outlet, a second hold-up tank having a second inlet and a second outlet, and an inlet distributor that is operatively connected to the first inlet and to the second inlet and that provides for directing flow of the loaded solvent stream to either the first hold-up tank or the second hold-up tank.

7 Claims, 1 Drawing Sheet

U.S. PATENT DOCUMENTS

Figure 1:
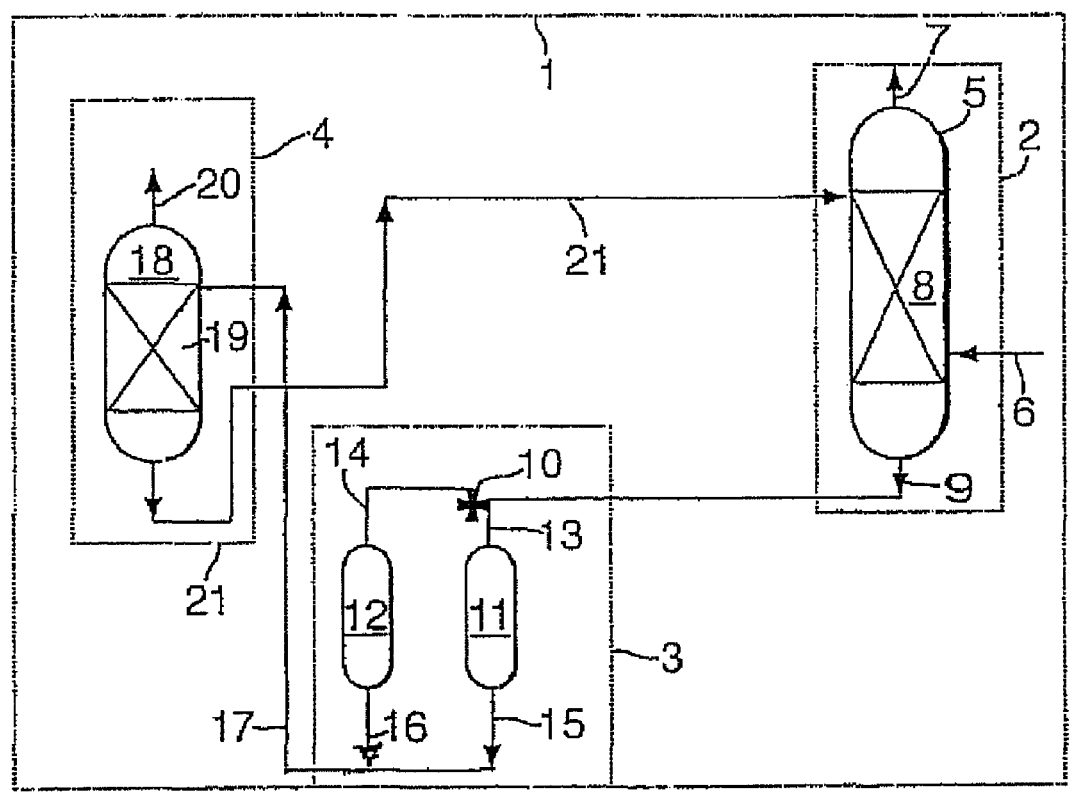

| | | | | |
|---|---|---|---|---|
| 5,681,470 A | * | 10/1997 | Safi | 210/603 |
| 5,766,313 A | | 6/1998 | Heath | 95/161 |
| 5,820,837 A | * | 10/1998 | Marjanovich et al. | 423/220 |
| 5,941,081 A | * | 8/1999 | Burgener | 62/50.1 |
| 6,352,575 B1 | | 3/2002 | Lindsay et al. | 95/184 |
| 6,398,849 B1 | * | 6/2002 | Green et al. | 95/187 |
| 6,464,875 B1 | * | 10/2002 | Woodruff | 210/603 |
| 6,984,257 B2 | | 1/2006 | Heath et al. | 95/24 |

* cited by examiner

TREATING UNIT FOR TREATING A LOADED SOLVENT STREAM HAVING A TIME VARYING CONCENTRATION OF CONTAMINANT

This application claims priority of European Patent Application No. 04251543.7, filed 16 Mar. 2005 and is a division of application Ser. No. 10/592,851, filed Sep. 14, 2006, now U.S. Pat. No. 7,597,742 B2.

FIELD OF THE INVENTION

The invention relates to a process and treating unit for treating a loaded solvent stream having a time-varying concentration of a contaminant.

BACKGROUND OF THE INVENTION

Loaded solvent streams can be obtained from processes for removing contaminants such as acidic compounds from a gas stream by washing the gas stream with fresh solvent. The use of solvents for removing contaminants such as acidic gasses is well known, see for instance the books A. L. Kohl and F. C. Riesenfeld, 1974, Gas Purification, $2^{nd}$ edition, Gulf Publishing Co. Houston and R. N. Maddox, 1974, Gas and Liquid Sweetening, Campbell Petroleum Series.

Preferably, a regenerable solvent is used in a continuous process.

Generally, loaded solvent streams are treated by removing the contaminant and regenerating the solvent. The removal of the contaminant from the loaded solvent stream can be effected for example by contacting the loaded solvent stream with a suitable stripping agent and removing the contaminant from the loaded stripping agent. In the case where the concentration of contaminant in the loaded solvent varies with time, the concentration of the contaminant in the loaded stripping agent will also vary in time. The contaminant removal from a loaded stripping agent that has a time-varying concentration of contaminant can cause problems, especially when the conditions such as temperature, pressure, size of catalyst bed etc. required to remove such a contaminant depend to a large extent on the concentration of the contaminant.

It is therefore desirable to provide a treating process enabling the further processing of loaded solvents with a time-varying concentration of contaminant.

SUMMARY OF THE INVENTION

To this end, the invention provides a process for treating a loaded solvent stream having a time-varying contaminant concentration, the process comprising the steps of: (a) providing a plurality of hold-up tanks; (b) feeding the loaded solvent stream in dependence on its contaminant concentration to one or more of the hold-up tanks and; (c) allowing loaded solvent stream to flow from the plurality of hold-up tanks to obtain a smoothed loaded solvent stream having a reduced time-varying contaminant concentration.

Step (b) and step (c) can be done in sequence but can also be done parallel.

The invention further provides a treating unit comprising a circuit for circulating a solvent stream, which circuit includes a device for smoothing contaminant peak concentrations, said device comprising a plurality of hold-up tanks, each hold-up tank having at least one inlet and an outlet equipped with an outlet valve, the device further comprising an inlet distributor allowing the control of solvent flow to one or more of the hold-up tanks.

The use of a plurality of hold-up tanks instead of for example a single stirred tank offers advantages. In a single stirred tank, the loaded solvent would be collected and stirred in the hold-up tank. A problem arising when using a single stirred tank is that measures have to be taken to ensure that the whole tank is stirred to achieve a homogeneous concentration of the contaminant.

Another problem when using a single stirred tank is that the inlet peak of loaded solvent entering the single stirred tank would always cause an outlet peak. Only in the case of an infinitely large tank could the outlet peak be eliminated. When using a plurality of hold-up tanks, the smoothing of peak concentrations of contaminant in the solvent stream can be achieved. After treatment in a process according to the invention, the concentration of contaminant in the treated solvent stream shows less fluctuation in time.

The process and unit according to the invention ensure that the final outlet flow from the plurality of hold-up tanks, which is the combined stream from the first and the second outlet streams, has a reduced time-varying contaminant concentration.

DETAILED DESCRIPTION OF THE INVENTION

Smoothing of time-varying contaminant concentration in loaded solvent streams is desirable for optimum operation of a contaminant removal unit, wherein contaminants are removed from the loaded solvent stream.

A particular situation is when a loaded solvent stream is derived from an upstream unit for removal of contaminants from a gas stream. This situation occurs for example in a gas treating unit wherein contaminants, especially sulphur contaminants such as mercaptans and/or hydrogen sulphide, are removed from a loaded gas stream in an upstream unit comprising at least one adsorbent bed. In the case where the upstream unit comprises two beds, one bed will be in adsorption mode (meaning that the operating conditions of the bed are such that contaminant adsorption from the loaded gas stream onto the bed will take place), while the other bed is in regeneration mode (meaning that the operating conditions of the bed are such that contaminant desorption will take place from the bed into a regeneration gas stream). Because regeneration and thus, desorption of contaminants, usually takes place during a relatively short period of time, the concentration of contaminants in the regeneration gas will not be constant with time. Instead, there will be time intervals where the concentration of contaminants is relatively high compared to the average concentration of contaminant over a long period of time (peak concentrations) and time intervals where the contaminant concentration is relatively low compared to the average concentration of contaminant over a long period of time (off-peak concentrations).

In general, the regeneration gas stream having a time-varying contaminant concentration is purified by contacting the regeneration gas stream with a solvent, whereby the contaminants are transferred from the regeneration gas stream to a solvent. In this way, a solvent stream loaded with contaminants having a time-varying contaminant concentration is obtained because the peak and off-peak contaminant concentrations in the regeneration gas stream will translate into peak and off-peak contaminant concentrations in the loaded solvent stream. In other words, the regeneration gas stream will have a time-varying contaminant concentration.

When purifying the loaded solvent stream having a time-varying contaminant concentration, typically by contacting the solvent stream with a suitable stripping agent, a stripping agent stream loaded with contaminants is obtained. The contaminants are typically removed from this loaded stripping agent stream in a contaminant recovery unit.

In the contaminant recovery unit, contaminants are converted to a product suitable to be discharged from the contaminant recovery unit. Generally, the operating conditions of the contaminant recovery unit are set to enable converting a certain range of contaminant concentration in the loaded stripping agent stream. If the loaded stripping agent stream comprises a time-varying concentration of contaminant, the operating conditions in the contaminant recovery unit will have to be adjusted each time the contaminant concentration is outside this range, to enable converting the contaminants to a desired level. This requires a more complicated contaminant recovery unit and results in a cumbersome process.

The process according to the present invention enables the removal of time-varying concentrations of a contaminant, resulting in a loaded gas stream with a constant concentration of contaminant. This offers advantages over a conventional process wherein the time-varying concentration of a contaminant in the loaded solvent is not dealt with.

The invention will now be discussed in more detail by way of example with reference to FIG. 1.

FIG. 1 shows schematically a typical treating unit according to the invention. The treating unit comprises a circuit for circulating a solvent stream, indicated by a rectangle that is referred to with reference number 1. The circuit includes an absorber unit indicated by a rectangle that is referred to with reference number 2, a device for smoothing contaminant peak concentrations indicated by a rectangle that is referred to with reference number 3 and a regenerator unit indicated by a rectangle that is referred to with reference number 4.

The absorber unit 2 includes an absorber 5 with outlets and inlets. A gas stream loaded with contaminants can enter the absorber via inlet 6. In the absorber, the gas stream loaded with contaminants is contacted with regenerated solvent via line 21, whereby the contaminants are transferred from the gas stream to the solvent, creating a loaded solvent stream. The treated gas stream exits the absorber via line 7. The gas absorber comprises internals 8. Internals in an absorber wherein a gas mixture is contacted with an absorbent solvent are known in the art and can comprise contacting layers, suitably from 5-80 contacting layers, such as valve trays, bubble cap trays, baffles and the like. Structured packing may also be applied. One outlet of the absorber is connected via line 9 to the device for smoothing contaminant peak concentrations 3.

The device for smoothing contaminant peak concentrations comprises an inlet distributor 10, a first hold-up tank 11 and a second hold-up tank 12. The inlet distributor 10 allows the solvent to flow either into the first hold-up tank 11 via inlet 13 or into the second hold-up tank 12 via inlet 14.

A preferred suitable inlet distributor is a three-way valve (as shown in FIG. 1), designed in such a way that the flow of solvent is directed to only one of the hold-up tanks during a time interval. This allows directing the flow either to the first hold-up tank, or alternatively to the second hold-up tank.

Another preferred inlet distributor is a system of two separate control valves (not shown in FIG. 1), one control valve connected to the first hold-up tank and the other control valve connected to the second hold-up tank, the two control valves adjusted in such a way that when one control valve allows the flow of solvent stream to enter one of the hold-up tanks during a certain time interval, the other control valve prevents the flow of solvent stream to enter the other hold-up tank. Alternatively, the two control valves can be adjusted in such a way to allow the flow of solvent to enter both tanks simultaneously. Preferably the inlet distributor is arranged so as to direct the flow to the tanks in dependence on the concentration of the loaded solvent stream. This can be based on knowledge on the time dependence of the contaminant concentration, as explained hereinabove, and/or can be based on information gathered using means for determining the contaminant concentration.

The first hold-up tank has an outlet 15 and the second hold-up tank has an outlet 16. Both outlets are equipped with valves that can allow or prevent the solvent contained in the hold-up tank to exit the hold-up tank via the outlet. Both outlets 15 and 16 debouche into line 17. Line 17 is connected to the regenerator unit 3.

The regenerator unit 3 comprises a regenerator 18 with inlets and outlets. Line 17 debouches into an inlet of regenerator 4. Regenerators or stripping columns are well-known. The regenerator can optionally comprise internals 19. In the regenerator, the loaded solvent stream is heated and contacted with a stripping agent stream, for example a stripping gas stream, whereby the contaminants are transferred from the solvent stream to the stripping agent stream, creating a loaded gas stream and a regenerated solvent. The loaded stripping agent stream can exit the regenerator via outlet 20. The regenerated solvent stream can be led back to the absorber via line 21, thereby completing the circuit.

In the process according to the invention, the loaded solvent stream is fed in dependence to its contaminant concentration to one or more of the hold-up tanks. It can in general be advantageous to lead the loaded solvent stream into either a first or a second tank. But in some situations it may also be preferred to feed more than one tank at the same time, for example depending on the filling level in the tanks.

It will be understood that the invention also includes systems comprising more than 2 hold-up tanks. For example, the hold-up tank for peak concentrations can be split up into two or more smaller tanks to enable easier mixing while at the same time the two or more smaller tanks operate as one hold-up tank. Likewise, the hold-up tank for off-peak concentrations can be split up into two or more smaller tanks while at the same time the two or more smaller tanks operate as one hold-up tank. Another example is feeding the loaded solvent stream to the plurality of hold-up tanks according to more than one contaminant concentration threshold, for example: high contaminant concentration, intermediate contaminant concentration and low contaminant concentration. It will be understood that the details of the process control depend inter alia on the contaminants of the solvent stream and/or on the variation in contaminant concentration and can be adjusted to achieve the desired reduction in time-variation of contaminant concentration in the treated solvent stream.

To enable feeding the loaded solvent stream to the tanks in dependence to the contaminant concentration, knowledge about the time-variation of the contaminant concentration is needed.

In one embodiment, knowledge about the time-variation of the contaminant concentration is known in advance because it is derived from upstream process steps. For example, as explained earlier, the peak and off-peak contaminant concentrations in a regeneration gas stream will translate into peak and off-peak contaminant concentrations in the loaded solvent stream. Thus, in the situation where the loaded solvent stream is obtained from an upstream process, the time variation in contaminant concentration in the loaded solvent stream can be derived from the time-variation of contaminant concentration in the upstream process. This information is generally sufficient for feeding the loaded solvent stream to the hold-up tanks in dependence on contaminant concentration and it is then not necessary to measure contaminant concentration.

Therefore, in a preferred embodiment, the invention is a process for treating a loaded solvent stream having a time-varying concentration of a contaminant, the process comprising the steps of: (a) leading at least part of the loaded solvent stream to a first hold-up tank during a time interval t1, the first hold-up tank issuing a first outlet solvent stream; (b) leading at least part of the loaded solvent stream to a second hold-up tank during a time interval t2, the second hold-up tank issuing a second outlet solvent stream; and (c) combining the first and second outlet solvent streams issued from the hold-up tanks to a final outlet solvent stream.

In a specific embodiment, the invention is a process for treating a loaded solvent stream having a time-varying concentration of a contaminant, the process comprising the steps of: (a) leading the loaded solvent stream to a first hold-up tank during a time interval t1, the first hold-up tank issuing a first outlet solvent stream; (b) leading the loaded solvent stream to a second hold-up tank during a time interval t2, the second hold-up tank issuing a second outlet solvent stream; and (c) combining the first and second outlet solvent streams issued from the hold-up tanks to a final outlet solvent stream.

Time interval t1 (peak concentrations) and time interval t2 (off-peak concentrations) refer respectively to the time interval during which the concentration of contaminant is relatively high compared to the average concentration of contaminant over a long period of time (t1) and the time interval during which the concentration of contaminant is relatively low compared to the average concentration of contaminant over a long period of time (t2).

The process is especially advantageous when the first outlet flow is (t1/T)*circulation rate of the solvent, and the second outlet flow is (t2/T)*circulation rate of the solvent, T being the run cycle time defined as the sum of t1 and t2.

As set out earlier, the loaded solvent stream having peak and off-peak concentrations can originate from an upstream unit comprising at least two adsorbent beds. The run cycle time T will then be the shortest time interval (period) after which the contaminant concentration versus time function of the regeneration gas stream repeats itself.

Fluctuation in contaminant concentration can be especially cumbersome in cases where the technology used for removal of contaminant is sensitive to fluctuations in concentration. Examples are removal of mercaptans or hydrogen sulphide.

In cases where it is desirable to reduce fluctuations as much as possible, it is desirable to maintain a multiplication factor in the range of from 1.0 to 1.7. In cases where a certain degree of fluctuation is acceptable, the multiplication factor can be in the range of from 0.3 to 0.95, preferably from 0.4 to 0.9. This allows the use of smaller hold-up tanks, giving advantages in terms of setting-up and running the gas-treating unit, as well as economical benefits, while at the same time the extent of reduction in the fluctuation of contaminant concentration is still sufficient.

In a preferred embodiment, t1 and t2 are known in advance or predetermined. For example, when the loaded solvent stream is obtained from an upstream process wherein contaminants are transferred from a gas stream to a solvent stream to obtain the loaded solvent stream, the time-dependency of the contaminant concentration (and thus, t1 and t2) can be known or predetermined from the time-dependency of contaminant concentration in the gas stream. An advantage of this embodiment is that the size of the hold-up tanks can be dimensioned such that a predetermined concentration fluctuation of contaminant in the smoothed solvent stream can be guaranteed, without the need for additional equipment for measuring contaminant concentration. In the event that the time variation of the contaminant concentration is known in advance, this knowledge can be used at the design stage of the device for smoothing contaminant peak concentrations, in particular for selecting the volume of the hold-up tanks. The volume of the first hold-up tank is suitably approximately equal to the circulation rate of the solvent (in $m^3/s$) through the circuit, multiplied by a first time interval t1 (in s) and multiplied by a factor in the range of from 0.3 to 1.7. The volume of the second hold-up tank is approximately equal to the circulation rate of the solvent (in $m^3/s$) through the circuit multiplied by a second time interval t2 (in s) and multiplied by a factor in the range of from 0.3 to 1.7. The volume of the first and second hold-up tank can be adjusted in order to achieve the desired degree of reduction of fluctuation in contaminant concentration.

The value of t1 is typically in the range of from 0.05 to 0.9 times T, preferably from 0.1 to 0.7 times T, more preferably from 0.2 to 0.5 times T, still more preferably from 0.3 to 0.4 times T. The total run time of the process comprises several run cycles. It will be understood that one run cycle can comprise several intervals wherein the concentration of contaminant is relatively high and several time intervals wherein the concentration of contaminant is relatively low.

In the case where one run cycle comprises several intervals wherein the concentration of contaminant is relatively high and several time intervals wherein the concentration of contaminant is relatively low, t1 refers to the accumulated time intervals wherein the concentration of contaminant is relatively high and t2 refers to the accumulated time intervals wherein the concentration of contaminant is relatively low.

Typically, during t1 the contaminant concentration in the loaded solvent stream is between about 5% to about 10% higher, relative to the average concentration measured during the sum of both time intervals t1 and t2.

Typical values for t1 range from about 0.05 and 0.9 times the total cycle time T, preferably between 0.1 and 0.7 times T, more preferably between 0.2 and 0.5 times T, still more preferably between 0.3 and 0.4 times T.

In the event that the time-variation of the contaminant concentration is not known in advance, a threshold value can be predetermined or predefined. The loaded solvent stream can then be allowed to flow into one hold-up tank if the concentration of the contaminant exceeds this predefined threshold value and to another hold-up tank if the contaminant concentration is below the predefined threshold value. It will be understood that the threshold value can be adapted over time or that there can be more than one predetermined or predefined threshold value, to enable several degrees of reduction in time-variation of contaminant or to take into account the presence of more than one contaminant.

Threshold values depend inter alia on the nature and type of the contaminant to be removed. For typical contaminants, for example sulphur contaminants such as mercaptans and/or hydrogen sulphide, threshold values range from about 2 ppmv to about 1 volume %, preferably from about 5 ppmv to about 0.5 volume %, calculated as the concentration of contaminant in the loaded solvent. Typical threshold values for mercaptans (RSH) are from about 3 ppmv and about 15 ppmv.

One way to determine whether the contaminant concentration is above the predefined or predetermined threshold value is to measure the contaminant concentration. The contaminant concentration can for example be monitored online using a suitable analysis method and based on the result, the loaded solvent flow is then led to one or more hold-up tanks. However, it may not be possible to exactly dimension the hold-up tanks such that a predetermined reduction in time-varying contaminant concentration in the outlet flow to the contaminant recovery unit can be guaranteed under all circumstances. Still, even in this embodiment a considerable reduction in time-variation of contaminant concentration can be achieved.

A further way to take a concentration measurement into account in feeding the loaded solvent stream to the tanks is the following. The contaminant concentration is monitored over a certain period of time to evaluate whether the time-variation shows a pattern in time, for example periods of relatively high contaminant concentration, alternated by periods of relatively low contaminant concentration. Based on this pre-established time-dependency, the control of the flow to the hold-up tanks can be performed.

The process according to the invention enables the treatment of any loaded solvent stream having a time-varying concentration of a contaminant. Reference herein to a contaminant is to one or more compounds to be removed from the solvent stream. Typically, the contaminant is an acidic compound, for example a sulphur compound.

In a preferred embodiment, the contaminant is one or more compounds selected from the group of $H_2S$, RSH, $CS_2$ and COS, preferably RSH. Especially the removal of $H_2S$ and mercaptans (RSH) from a gas stream comprising these compounds is of considerable importance, because the toxicity and smell of $H_2S$ and mercaptans renders their presence highly undesirable. Moreover, $H_2S$ is very corrosive to the gas pipeline network. In view of the increasingly stringent environmental requirements, removal of $H_2S$ and mercaptans has become even more important.

Reference herein to RSH is to aliphatic mercaptans, especially $C_1$-$C_6$ mercaptans, more especially $C_1$-$C_4$ mercaptans, aromatic mercaptans, especially phenyl mercaptan, or mixtures of aliphatic and aromatic mercaptans. The invention especially relates to the removal of methyl mercaptan, ethyl mercaptan, normal- and iso-propyl mercaptan and butyl mercaptan isomers.

Suitable solvent streams are solvent streams comprising physical solvents or solvent streams comprising a combination of chemical and physical solvents. Suitable chemical solvents are primary, secondary and/or tertiary amines derived alkanolamines or aqueous solutions thereof. The most frequently used amines are derived from ethanolamine, especially monoethanol amine (MEA), diethanolamine (DEA), triethanolamine (TEA), diisopropanolamine (DIPA) and methyldiethanolamine (MDEA). Suitable physical solvents are selected from the group of cyclo-tetramethylene-sulfone and its derivatives, aliphatic acid amides, N-methylpyrrolidone, N-alkylated pyrrolidones and the corresponding piperidones, methanol, ethanol, mixtures of dimethylethers of polyethylene glycols, mixtures of dialkylethers of polyethylene glycols and N-methyl-2-pyrrolidone (NMP).

A preferred solvent stream is a solvent stream comprising an aqueous mixture of a chemical solvent, especially DIPA and/or MDEA, and a physical solvent, especially cyclotetramethylene-sulfone. Such a mixture shows good absorption capacity and good selectivity against moderate investment costs and operational costs. It performs very well at high pressures, especially between 20 and 90 bara.

Another preferred solvent stream is a solvent stream comprising N-methyl-2-pyrrolidone (NMP). NMP is a high boiling solvent which has an especially high solubility for $H_2S$. This solvent is especially suitable for selective $H_2S$ absorption in the presence of $CO_2$.

Yet another preferred solvent stream is a solvent stream comprising mixtures of dimethylethers of polyethylene glycols and/or mixtures of dialkylethers of polyethylene glycols. The solubility of $H_2S$ in these solvents is high, enabling the selective removal of $H_2S$. Furthermore, mercaptans, especially methyl mercaptan, are highly soluble in mixtures of dimethylethers of polyethylene glycols, enabling the selective removal of mercaptans.

The amount of contaminant removal in the absorber unit can be optimised by regulating the solvent/gas ratio. A suitable solvent/gas ratio is from 1.0 to 10 (w/w), preferably between 2 and 6.

The loaded solvent may contain beside contaminants such as $CO_2$, $H_2S$, RSH and/or COS also appreciable amounts of other compounds from the gas mixture to be purified, e.g. hydrocarbons, carbon monoxide, hydrogen etc. It may be advantageous to remove these (non-acidic) compounds at least partially from the loaded solvent by flashing to a pressure which is higher that the sum of the partial pressures of the contaminants. In this way only very small amounts of contaminants are released from the solvent together with the (non-acidic) compounds. The loaded solvent may advantageously flashed in a second step to a pressure which is below the partial pressures of the contaminants at the prevailing temperature. Usually the flash is carried out at a pressure between 1 and 15 bara, preferably between 1 and 10 bara, more preferably ambient pressure.

Typically, the hold-up tanks are kept at pressures between about 1 and 150 bara, suitably between 2 and 100 bara, preferably between about 3 and 15 bara. Typical temperatures at which the hold-up tanks are kept are from 0 to 130° C., preferably between 30 and 70° C., more preferably between 40 and 60° C.

In the regenerator unit, the regeneration can be done either at high temperatures and ambient pressure or at high pressure and ambient temperature. Typically, the regeneration unit is kept at a higher temperature than the absorber unit.

In a preferred embodiment, the loaded solvent, optionally after flashing as described above is regenerated by heating in a regeneration unit, suitably at a temperature between 30 and 170° C., preferably between 70 and 150° C., suitably at a pressure between 1 and 2 bara. The heating is preferably carried out with steam or hot oil.

In another preferred embodiment, the loaded solvent, optionally after flashing as described above is regenerated at a relatively high pressure, preferably between 2 and 120 bara, more preferably between 5 and 100 bara, suitably at a temperature between 10 and 30° C. The lean absorbent solvent, issued from the regeneration unit, will be used again in the absorption unit as described before. Suitably the lean solvent is heat exchanged with the loaded solvent.

In an especially preferred embodiment, the loaded gas stream obtained from the regeneration unit is led to a recovery unit wherein the contaminant is removed from the stripping agent stream.

Suitably, the loaded solvent stream is obtained by the steps of: (d) introducing lean solvent into an absorber unit; (e) introducing a contaminated gas stream in the absorber unit; (f) contacting the contaminated gas stream with the lean solvent in the absorber unit, thereby transferring the contaminant to the solvent to obtain treated gas and the loaded solvent stream. The contaminated gas stream can be any inert gas stream comprising contaminants and may comprise synthesis gas, obtained for instance by (catalytic) partial oxidation and/or by steam methane reforming of hydrocarbons, e.g. methane, natural or associated gas, naphtha, diesel and liquid residual fractions, gases originating from coal gasification, coke oven gases, refinery gases, hydrogen and hydrogen-containing gases, synthesis gas or natural gas.

In an especially preferred embodiment, the contaminated gas stream entering the absorber unit is the regeneration gas stream issued from a mol sieve bed which is being regenerated, the mol sieve bed having been used to absorb contaminants from a feed gas stream. Typically, the mol sieve bed is regenerated either by increasing the temperature at ambient pressure or by increasing the pressure at ambient temperature. As set out earlier, when contaminants are removed from the regeneration gas stream in a process whereby the contaminants are transferred from the regeneration gas stream to a solvent, a solvent stream loaded with contaminants is obtained. The peak and off-peak contaminant concentrations in the regeneration gas stream will translate into peak and off-peak contaminant concentrations in the loaded solvent stream.

Optionally, the process can have the additional steps of: (g) contacting the smoothed loaded solvent stream of step (c) in a regenerator unit with a stripping agent stream to obtain a loaded stripping agent stream and a lean solvent stream and (h) leading the loaded stripping agent stream to a contaminant recovery unit. The lean solvent stream can then be led back to the absorber unit (step (i)).

By contacting the smoothed loaded solvent stream with a stripping agent stream, contaminants are transferred from the loaded solvent stream to the stripping agent stream, resulting in a stripping agent stream loaded with contaminants. The contaminants are typically removed from this stripping agent stream in a contaminant recovery unit.

In the case of sulphur contaminants, the recovery unit is a sulphur recovery unit. Typically, in the sulphur recovery unit the sulphur contaminants are removed by catalytically converting them to elemental sulphur for example using the known Claus process. If the loaded gas stream comprises a time-varying concentration of sulphur contaminant, the operating conditions in the sulphur recovery unit will have to be adjusted to enable converting the sulphur contaminants. This requires a more complicated sulphur recovery unit and results in a cumbersome process. The process according to the present invention enables the removal of time-varying concentrations of a contaminant, resulting in a loaded stripping agent stream with a constant concentration of contaminant. This offers advantages over a conventional process wherein the time-varying concentration of a contaminant in the loaded solvent is not dealt with, resulting in a loaded stripping agent stream having a time-varying concentration of contaminant.

In a typical process according to the invention will now be described with reference to the FIGURE. A contaminated gas stream having a time-varying concentration of contaminant is led via line 6 to absorber 5. In absorber 5, the contaminated gas stream is contacted in a counter current way with a solvent, whereby the contaminant is transferred from the gas stream to the solvent.

A treated gas stream from which the contaminants have been removed is led from the absorber via line 7. A loaded solvent stream having a time-varying concentration of contaminant is issued from the absorber unit and led via line 9 to the device for smoothing contaminant peak concentrations 3.

During time interval t1 the concentration of contaminant is relatively high (peak concentrations) and the inlet distributor 10 is adjusted in such a way that it connects line 9 to inlet 13 of the first hold-up tank 11, allowing the loaded solvent stream to be collected in the first hold-up tank 11. At the end of time interval t1, the inlet distributor 10 is adjusted in such a way that it now connects line 9 to the inlet 14 of the second hold-up tank 12, allowing the loaded solvent stream to be collected in the second hold-up tank 12 during time interval t2 during which the concentration of contaminant is relatively low (off-peak concentrations).

The outlet 15 of the first hold-up tank 11 is equipped with a first outlet valve which enables to regulate the outlet flow from the first hold-up tank in such a way that the outlet flow from the first hold-up tank is (t1/T)*circulation rate of the solvent, T being the run cycle time defined as the sum of t1 and t2. In the regenerator, the loaded solvent stream is heated and contacted with a stripping gas stream, whereby the contaminants are transferred from the solvent stream to the gas stream, creating a loaded gas stream and a regenerated solvent stream. The regenerated solvent stream, which now contains little or no contaminants, is led via line 21 back to the absorber 5. The loaded gas stream, which contains the contaminants, is led from the regenerator via line 20. In a preferred embodiment, line 20 is connected to a recovery unit.

The invention will now be illustrated with the following, non-limiting example.

At a solvent circulation rate of 5 $m^3$/minute, a time t1 of 90 minutes and a cycle time T of 240 minutes, a system of two hold-up tanks, the first hold-up tank having a volume of 450 $m^3$, the second hold-up tank having a volume 750 $m^3$, results in a final outlet solvent stream wherein the variation in concentration of contaminant is less than 0.05% (based on the starting variation). The term "variation" as used herein refers to the difference in contaminant concentration between the maximum of the peak concentration and maximum of the off-peak concentration. The total volume of the two hold-up tanks is 1200 $m^3$.

When using a single continuously stirred tank with a volume of 1200 $m^3$ instead of the system of two hold-up tanks, a variation in concentration of contaminant of 20% in the final outlet solvent stream is observed. Even when using a single continuously stirred tank with a volume of 2500 $m^3$, still a variation in concentration of contaminant of 10% (based on the starting variation) in the final outlet solvent stream is observed. In order to further reduce the variation in concentration of contaminant in the final outlet solvent stream to approach the 0 to 0.05% range, the size of the single stirred tank would have to be increased in such a way that the limit of an infinitely large single stirred tank is approached.

The process and gas-treating unit according to the invention enables a reduction in the variation in concentration of contaminant to less than 0.05% (based on the starting variation). In addition, a substantially lower total volume of hold-up tanks is required compared to a process and gas-treating unit using a single stirred tank.

That which is claimed is:

1. A treating unit, comprising: an absorber unit for contacting a regenerated solvent with a gas stream loaded with contaminants to yield a treated gas stream and a loaded solvent stream; a regenerator unit for stripping said loaded solvent stream, or a derivative thereof, to yield a loaded gas stream and said regenerated solvent; and a device for smoothing contaminant peak concentrations in said loaded solvent stream and for receiving said loaded solvent stream, wherein said device comprises a first hold-up tank having a first inlet and a first outlet, a second hold-up tank having a second inlet and a second outlet, an inlet distributor that is operatively connected to said first inlet and to said second inlet and that provides for directing flow of said loaded solvent stream to either said first hold-up tank or said second hold-up tank.

2. A treating unit as recited in claim 1, wherein said first outlet of said first hold-up tank is equipped with a first outlet valve for regulating outlet flow of a first outlet solvent stream from said first hold-up tank, and wherein said second outlet of said second hold-up tank is equipped with a second outlet valve for regulating outlet flow of a second outlet solvent stream from said second hold-up tank.

3. A treating unit as recited in claim 2, wherein said first outlet is operatively connected to said regenerator unit to provide for the introduction of said first outlet solvent stream to said regenerator unit.

4. A treating unit as recited in claim 3, wherein said second outlet is operatively connected to said regenerator unit to provide for the introduction of said second outlet solvent stream to said regenerator unit.

5. A treating unit as recited in claim 4, wherein said first outlet and said second outlet are operatively connected to provide for a combination of said first outlet solvent stream and said second outlet solvent stream to give a final outlet solvent stream for introduction to said regenerator unit.

6. A treating unit as recited in claim 5, wherein said inlet distributor is a three-way valve providing said directing of said loaded solvent stream to either said first hold-up tank or said second hold-up tank.

7. A treating unit as recited in claim 5, wherein said inlet distributor includes a first inlet control valve for controlling flow of said loaded solvent stream to said first hold-up tank, and a second inlet control valve for controlling flow of said loaded solvent stream to said second hold-up tank.

* * * * *